United States Patent
Iwabuchi et al.

(10) Patent No.: US 6,896,981 B2
(45) Date of Patent: May 24, 2005

(54) TRANSPARENT CONDUCTIVE FILM AND TOUCH PANEL

(75) Inventors: Yoshinori Iwabuchi, Tokyo (JP); Taichi Kobayashi, Tokyo (JP); Shingo Ohno, Tokyo (JP); Yukihiro Kusano, Cambridge (GB); Masato Yoshikawa, Tokyo (JP)

(73) Assignee: Bridgestone Corporation, Tokyo (JP)

(*) Notice: Subject to any disclaimer, the term of this patent is extended or adjusted under 35 U.S.C. 154(b) by 3 days.

(21) Appl. No.: 10/194,963

(22) Filed: Jul. 15, 2002

(65) Prior Publication Data

US 2003/0087119 A1 May 8, 2003

(30) Foreign Application Priority Data

Jul. 24, 2001 (JP) ........................................ 2001-223326
Jul. 24, 2001 (JP) ........................................ 2001-223327
Aug. 2, 2001 (JP) ........................................ 2001-235027
Oct. 1, 2001 (JP) ........................................ 2001-305441

(51) Int. Cl.$^7$ ............................ B32B 15/04; B32B 9/00
(52) U.S. Cl. ..................... 428/698; 428/336; 428/408; 428/446; 428/469; 428/697; 428/699; 428/701; 428/702
(58) Field of Search ................................ 428/336, 446, 428/469, 689, 697, 698, 699, 701, 702, 408; 345/173

(56) References Cited

U.S. PATENT DOCUMENTS

| | | | | |
|---|---|---|---|---|
| 4,585,689 A | * | 4/1986 | Ohta et al. | 428/216 |
| 4,623,601 A | * | 11/1986 | Lewis et al. | 430/69 |
| 5,986,223 A | * | 11/1999 | Kim | 178/18.01 |
| 6,473,235 B2 | * | 10/2002 | Toyoshima et al. | 359/585 |
| 6,495,253 B1 | * | 12/2002 | Koyama et al. | 428/343 |
| 6,522,322 B1 | * | 2/2003 | Maeda et al. | 345/173 |

FOREIGN PATENT DOCUMENTS

| | | | | |
|---|---|---|---|---|
| EP | 697646 A1 | * | 2/1996 | G06F/3/033 |
| JP | 2-194943 | | 8/1990 | |
| JP | 07028598 A | * | 1/1995 | G06F/3/033 |
| JP | 2000351170 A | * | 12/2000 | B32B/7/02 |

\* cited by examiner

Primary Examiner—Stephen Stein
(74) Attorney, Agent, or Firm—Manabu Kanesaka

(57) ABSTRACT

A transparent conductive film has a polymer film 4 and a transparent conductive layer 5 formed on the polymer film 4. The transparent conductive layer includes indium oxide, a zinc oxide system and a tin oxide system. A covering layer 9, made of material different from that of the transparent conductive layer 5, is formed on the transparent conductive layer 5. A touch panel is provided with the transparent conductive film as its upper electrode 6A or lower electrode. The surface of the transparent conductive layer is covered with the covering layer, so that physical or chemical stresses generated during the input to the touch panel do not affect transparent conductive layer directly, thus preventing damages and delamination of the transparent conductive layer. Furthermore, the covering layer formed on the transparent conductive layer improves the strength of the transparent conductive film, thereby enhancing a resistance to wear.

22 Claims, 4 Drawing Sheets

Prior Art

TRANSPARENT CONDUCTIVE FILM AND TOUCH PANEL

FIELD OF THE INVENTION

The present invention relates to a transparent conductive film having a polymer film and a transparent conductive layer formed on the polymer film, wherein the conductive layer is resistant fully to delamination or removal and the conductive film has good electrical characteristics and good durability. The present invention further relates to a touch panel provided with the transparent conductive film.

BACKGROUND OF THE INVENTION

A resistive touch panel is widely used as an input unit for a household appliance or a portable terminal because the touch panel is easy to be miniaturized, lightened, and thinned. When a user pushes a part of the touch panel or draws with a specialized pen on a part of the touch panel, the part comes into contact with an opposing electrode, so that the portion and the electrode are electrically connected and a signal is inputted.

Figure 4:
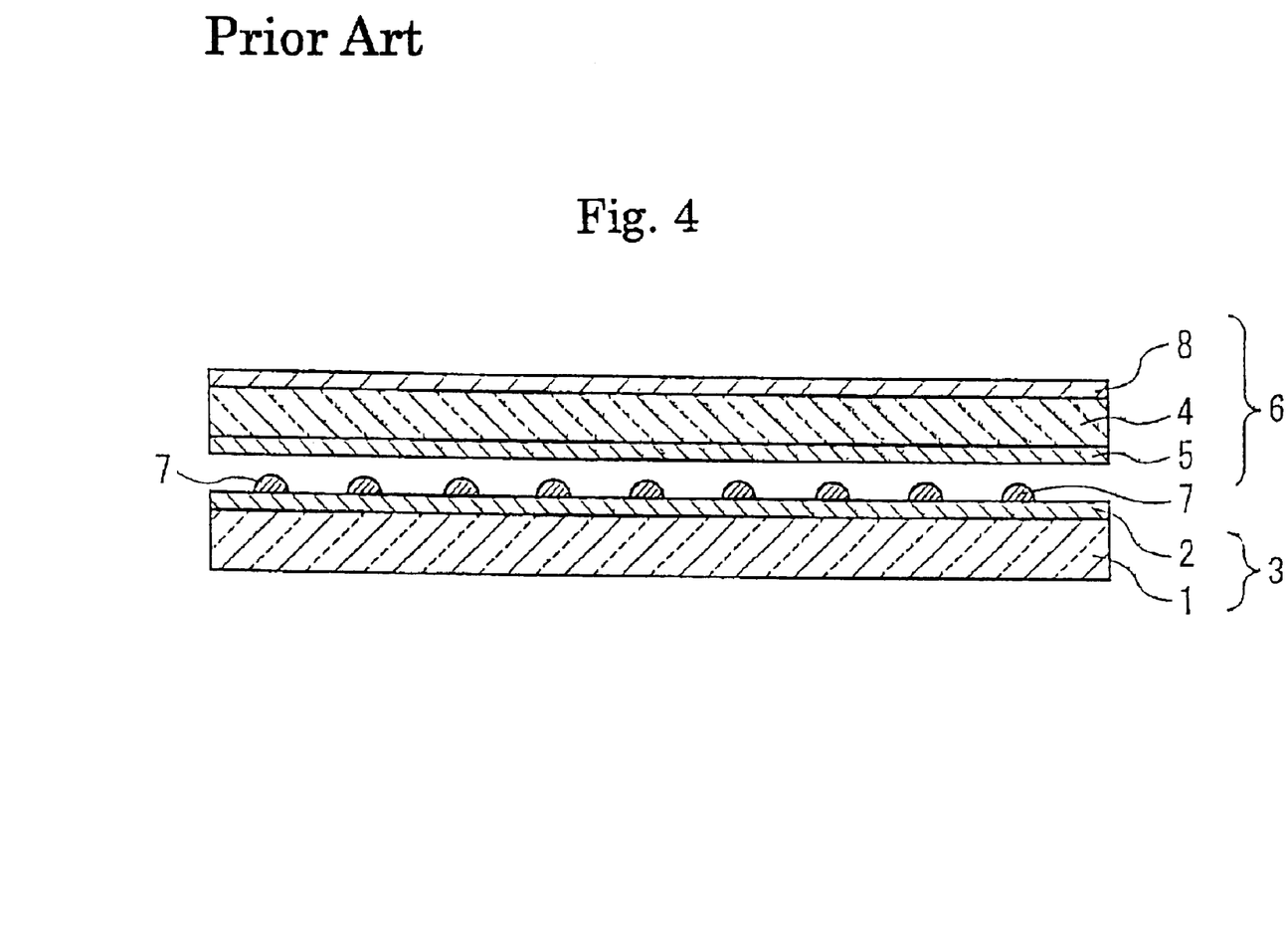
FIG. 4 shows a cross section of a conventional touch panel.

As shown in FIG. 4, a typical resistive touch panel has a lower electrode 3 having a glass plate 1 and a transparent conductive layer 2 formed thereon; an upper electrode 6 having a polymer film 4 and a transparent conductive layer 5 formed thereon; and spacers (microdot spacers) 7 interposed between the transparent conductive layers 2 and 5. Pressing the display surface of the upper electrode 6 with a finger or a pen makes the upper electrode 6 and the lower electrode 3 into contact with each other, so that these electrodes are electrically connected and a signal is inputted. The surface of the upper electrode 6 is overlaid with a hard-coating layer 8 for protecting the polymer film 4. Since the surface of the upper electrode 6 is rubbed with a finger or a pen, the upper electrode 6 requires resistance to wear, and therefore is provided with the hard-coating layer 8.

Japanese Patent H2-194943A discloses that after ITO (indium tin oxide) transparent conductive layer is deposited, heat treatment is conducted so as to crystallize ITO, for improving durability of the transparent conductive film for touch panel. However, since the substrate of the transparent conductive film is a polymer film, the temperature for the heat treatment is limited. The heat treatment thus needs to be conducted at relatively low temperature and for a long time, such as at 150° C. and for 24 hours. This causes problems of low productivity and high production cost.

In the touch panel, with the input with a finger or a pen, the transparent conductive layer 5 of the upper electrode 6 and the transparent conductive layer 2 of the lower electrode 3 are contacted and uncontacted repeatedly. The transparent conductive material such as ITO, which is a material for depositing transparent conductive layers 2, 5, has low resistance to wear and indentation. Therefore, in the transparent conductive layer 2 or 5, the transparent conductive layer 5 of the upper electrode 6, which deforms repeatedly during the input to the touch panel, is particularly easy to be cracked. In addition, the transparent conductive layer 5 is easy to be delaminated and removed from the polymer film 4 due to the repeated contact and uncontact between the transparent conductive layers 2 and 5, which are made of the same material.

When the transparent conductive layer 5 of the upper electrode 6 is damaged or delaminated, electrical resistivity of the surface of the transparent conductive layer 5 changes, and uniformity of the electrical resistivity is lost, thereby spoiling electrical properties, and thus the precise input can not be carried out. These cause a decrease in reliability of the touch panel, damages, defects, and a decrease in durability.

SUMMARY OF THE INVENTION

It is an object of the present invention to solve the aforementioned conventional problems, to provide a transparent conductive film comprising a polymer film and a transparent conductive layer formed on the polymer film, which can realize a touch panel having no problem of damage and delamination of the transparent conductive layer, and having good reliability and durability, and to provide a touch panel provided with the transparent conductive film.

A transparent conductive film of the first aspect of the present invention has a polymer film, a transparent conductive layer, which consists of either a zinc oxide system or a tin oxide system, formed on the polymer film, and further, a covering layer formed on the transparent conductive layer.

The surface of the transparent conductive layer is covered with the covering layer, so that physical or chemical stresses generated during the input to the touch panel do not affect transparent conductive layer directly, thus preventing damages and delamination of the transparent conductive layer.

Furthermore, the covering layer formed on the transparent conductive layer improves the strength of the transparent conductive film, thereby enhancing the resistance to wear.

A transparent conductive film of the second aspect of the present invention has a polymer film, a transparent conductive layer formed on the polymer film, and further, a covering layer consisting of dielectrics, formed on the transparent conductive layer.

The surface of the transparent conductive layer is covered with the dielectric layer, so that physical or chemical stresses generated during the input to the touch panel do not affect transparent conductive layer directly, thus preventing damages and delamination of the transparent conductive layer.

The dielectric layer formed on the transparent conductive layer also improves the strength of the transparent conductive film, thereby enhancing the resistance to wear.

Furthermore the dielectric layer gives effects of improving the electrical durability, as well as the physical and chemical durability of a transparent conductive layer when used in the touch panel, for example owing to the following mechanism, thereby providing a transparent conductive film and touch panel having superior responsibility and durability.

The transparent conductive layer usually has minute irregularities in its surface. When a transparent conductive film consisting of such a transparent conductive layer having irregularities in its surface is used for the upper electrode and/or the lower electrode of a touch panel, the projections among the irregularities are charged with electrical load, so that large Coulomb force is generated, resulting in production of an uneven electrical field distribution between the electrodes.

The production of the uneven electrical field distribution between the electrodes reduces the durability of the transparent conductive film and the touch panel.

The dielectric layer formed on the transparent conductive layer prevents the uneven electrical field distribution because of the micro-irregularities in the surface of the transparent conductive layer to be produced, thereby giving the excellent effect of improving the durability.

Dielectrics having very low electrical conductivity may be used as the dielectric layer when the thickness of the dielectric layer is very thin, because it will not deteriorate the electrical conductivity of the transparent conductive layer in its vertical direction, so that it will not affect the performance of the transparent conductive film.

A transparent conductive film of the third aspect of the present invention has a polymer film, a transparent conductive layer formed on the polymer film, and further, a covering layer made from metal, formed on the transparent conductive layer, or a covering layer produced by oxidizing, nitriding or oxynitriding a metal layer formed on the transparent conductive layer.

Forming a very thin metal covering layer on the surface of the transparent conductive layer exceedingly improves the transparent conductive film in resistance to wear. That is, the surface of the transparent conductive layer is covered with the covering layer, so that physical or chemical stresses generated during the input to the touch panel do not affect transparent conductive layer directly, thus preventing damages and delamination of the transparent conductive layer. Furthermore, the covering layer formed on the transparent conductive layer improves the strength of the transparent conductive film, thereby enhancing the resistance to wear.

Although a metal thin film usually has a shade of color and its light transmittance is low, the metal layer sufficiently improves durability even when it is very thin, so that the metal layer can be employed as the covering layer for the purpose of improving the resistance to sliding wear, by reducing its thickness to such an extent that the formation of the metal layer should not reduce the light transmittance too much.

Oxidizing, nitriding or oxynitriding the metal layer formed on the transparent conductive layer by heat treatment in an atmosphere of oxygen, or applying surface treatment with oxygen plasma or nitrogen plasma thereto improves transparence of the metal layer, thereby preventing deterioration of the light transmittance caused by forming the covering layer, while improving the resistance to sliding wear.

The covering layer made of the metal layer does not interrupt the electrical conduction of the transparent conductive layer. The covering layer produced by oxidizing, nitriding or oxynitriding the metal layer also does not affect the electrical conductivity of the transparent conductive layer in its vertical direction, because it is very thin in thickness.

In any of the first to third aspects, the transparent conductive film may have not only one covering layer but also two or more layers.

Though the covering layer improves durability of the transparent conductive layer, properties and functional characteristics of the transparent conductive film can be more improved by improving and adjusting a total luminous transmittance of the transparent conductive film and the control of its color shade also can be carried out by designing the refractive index, the thickness and the structure of lamination of the covering layer suitably.

A method for the manufacture of a transparent conductive film of the third aspect of the present invention is conducted by firstly forming a transparent conductive layer on a polymer film and then forming a covering layer on the transparent conductive layer. The covering layer is produced by firstly forming a metal layer on the transparent conductive layer and then oxidizing, nitriding or oxynitriding the metal layer. The covering layer improved in transparence by oxidizing, nitriding or oxynitriding the metal layer improves the transparent conductive film in resistance to wear, while preventing deterioration of its light transmittance.

The touch panel of the present invention is provided with the transparent conductive film of the present invention, or a transparent conductive film manufactured by the method for the manufacture of a transparent conductive film of the present invention.

DETAILED DESCRIPTION OF THE PREFERRED EMBODIMENTS

Hereinafter, the preferred embodiments of the present invention will be described in detail with reference to the drawings.

Figure 1:
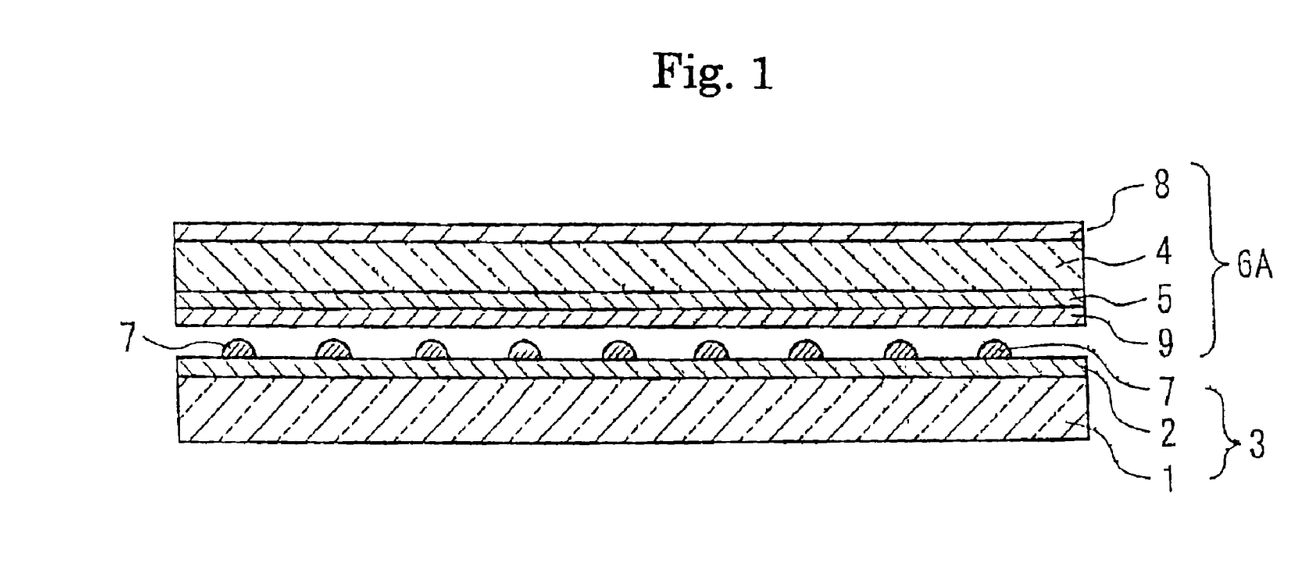
FIG. 1 shows a cross section of a touch panel of an embodiment provided with a transparent conductive film of the present invention.
Figure 2:
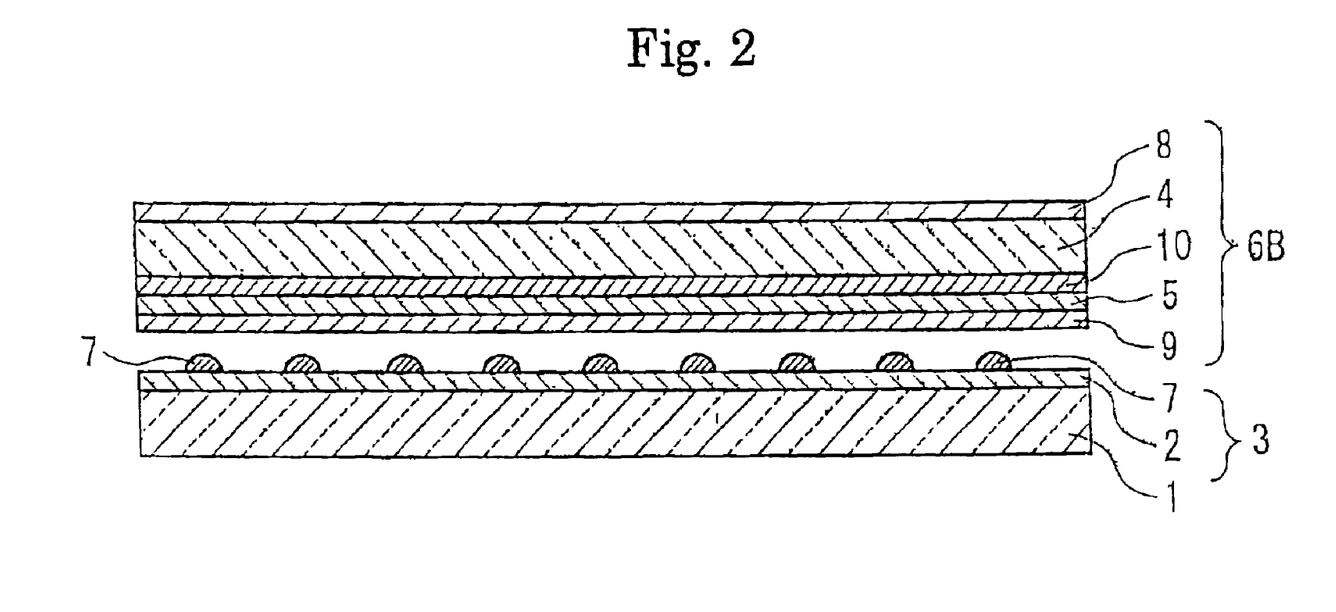
FIG. 2 shows a cross section of a touch panel of another embodiment provided with a transparent conductive film of the present invention.
Figure 3:
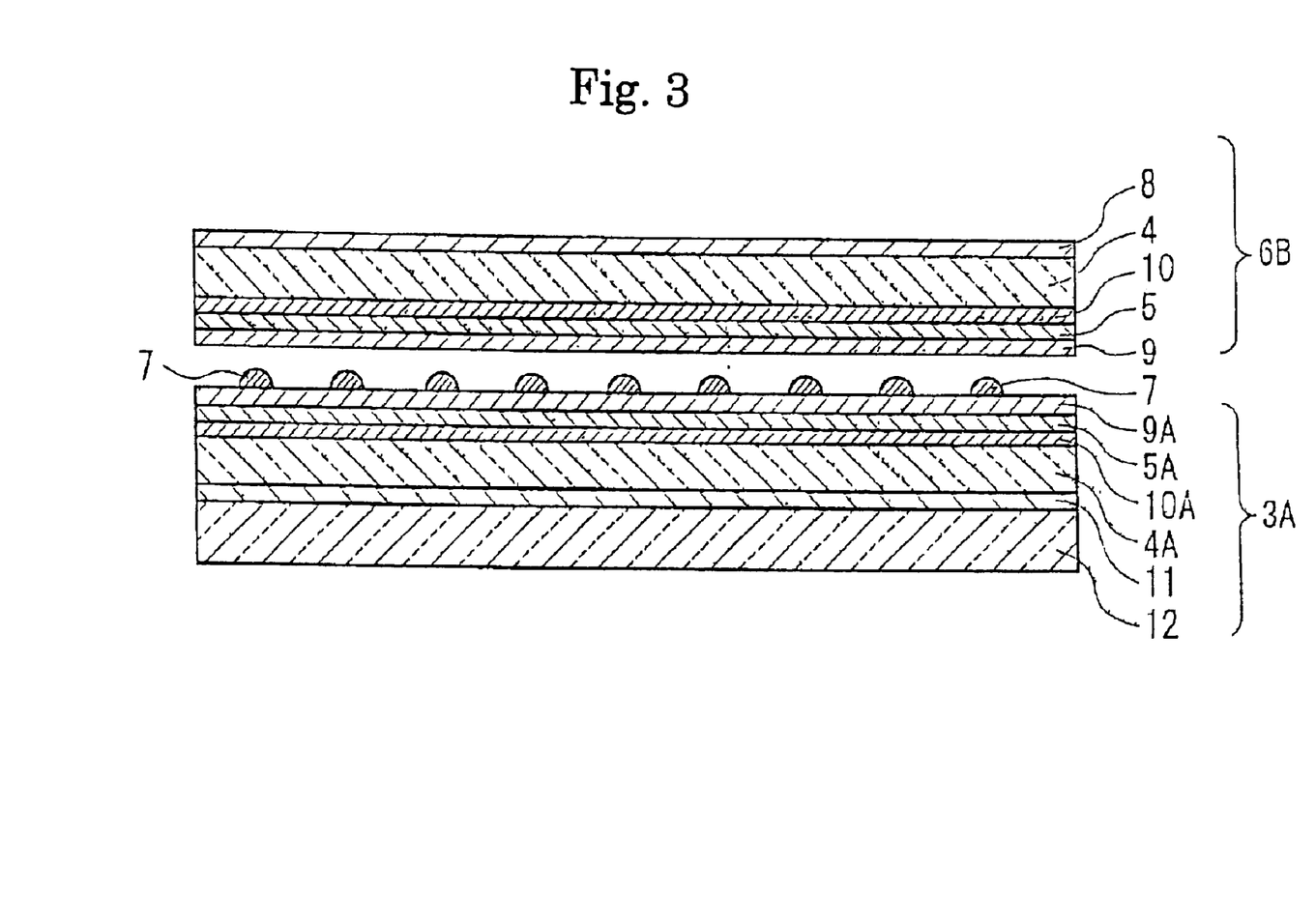
FIG. 3 shows a cross section of a touch panel of further another embodiment provided with a transparent conductive film of the present invention.

FIGS. 1 and 2 show cross sections of touch panels of embodiments, each of which is provided with a transparent conductive film of the present invention as an upper electrode. FIG. 3 shows a cross section of a touch panel of an embodiment provided with transparent conductive films of the present invention as an upper electrode and a lower electrode. In FIGS. 1 through 3, members which have the same functions as members shown in FIG. 4 are marked with the same numerals.

Each transparent conductive film of the first to third aspects of the present invention has a polymer film 4 or 4A, a transparent conductive layer 5 or 5A formed on the polymer film 4 or 4A, and a covering layer (protective film) 9 or 9A formed on the transparent conductive layer 5 or 5A.

In the transparent conductive films of the first to third aspects of the present invention, resin material for the polymer film which constitutes a substrate preferably is polyester, polyethylene terephtalate (PET), polybutylene terephtalate, polymethyl methacrylate (PMMA), acrylic resin, polycarbonate (PC), polystyrene, triacetate (TAC), polyvinyl alcohol, polyvinyl chloride, polyvinylidene chloride, polyethylene, ethylene-vinyl acetate copolymers, polyvinyl butyral, metal ion-crosslinked ethylene-methacrylic acid copolymers, polyurethane, cellophane, or the like, particularly preferable is PET, PC, PMMA, or TAC because of its high strength, and more particularly preferable is PET or TAC.

Though a thickness of such a polymer film changes according to application of the transparent conductive film, when the film is used as an upper electrode of a touch panel, the thickness thereof is preferably 13 μm to 0.5 mm. When the thickness of the polymer film is smaller than 13 μm, the polymer film may not have enough durability as an upper electrode. When the thickness exceeds 0.5 mm, the obtained touch panel becomes thick, and moreover, flexibility required as the upper electrode may not be obtained.

When the transparent conductive film is used as a lower electrode of a touch panel, the polymer film can be thicker than the aforementioned range, that is, the thickness of the polymer film can be 0.5 to 2 mm. Or as described bellow, however, the polymer film can also be the same thickness as that used as the upper electrode, by laminating it to a substrate such as a plastic board.

As shown in FIGS. 1 through 3, the transparent conductive film of the present invention may have a hard-coating layer 8 to be formed on a surface of the polymer film 4 opposite to the surface where the transparent conductive layer 5 is formed. Examples of the hard-coating layer 8 include acrylic-based layer, epoxy-based layer, urethane-based layer, silicone-based layer, and so on, and the thickness thereof is preferably from 1 to 50 μm.

The transparent conductive layer 5 may be formed on the polymer film 4 directly. Or, as shown in FIGS. 2, 3; a primary layer 10 or 10A may be interposed in between the polymer film 4 or 4A and the transparent conductive layer 5 or 5A. By forming such a primary layer 10 or 10A, adhesion of the transparent conductive layer 5 or 5A to the polymer film 4 or 4A is improved, and delamination of the transparent conductive layer 5 or 5A due to repeated deformation can be prevented effectively. That is, by forming the primary layer 10 or 10A on the polymer film 4 or 4A, gas generation from the polymer film 4 or 4A is prevented, so that the transparent conductive layer 5 or 5A can be deposited on the polymer film 4 or 4A with good adhesion. In addition, the primary layer 10 or 10A improves adhesion between the polymer film 4 or 4A and the transparent conductive layer 5 or 5A as an intermediate layer between these layers 4 or 4A and 5 or 5A. Furthermore, the primary layer 10 or 10A improves the strength of the transparent conductive film, thereby improving the resistance to scuffing.

In this case, examples of a material for forming the primary layer 10 or 10A include resins such as an acryl-based resin, an urethane-based resin and an epoxy-based resin, and hydrolyzed organic silicon compound.

Before the primary layer 10 or 10A and the transparent conductive layer 5 or 5A are formed on the polymer film 4 or 4A, the surfaces of the polymer film 4 or 4A may be applied with plasma treatment, corona treatment, washing treatment with a solvent, etc., according to the conventional methods.

For improving optical properties of the transparent conductive film, the primary layer 10 of the transparent conductive layer 5 may be composed of two layers of a low refractive index layer and a high refractive index layer, or of multi layers formed by forming a low refractive index layer and a high refractive index layer alternately. Or the surface of the hard-coating layer 8 may be exposed to anti-glare process or anti-reflection treatment.

Although the materials for the transparent conductive layer and covering layer of each aspect of the present invention will be described later, the light transmittance of the transparent conductive film usually, in case where the film is used for a PDP or a liquid crystal display which emits a light weakly, is preferably not smaller than 80%. Therefore, the thickness of the covering layer is determined in such a range that the light transmittance can be kept at the above rate. In case where the transparent conductive film is used for a cathode-ray tube having strong emission, since adjustment of its brightness is sometimes needed, the light transmittance of the film may be not greater than 80%.

As for the electrical conductivity, when the transparent conductive film is used as a touch panel, the surface resistivity at a side of the transparent conductive film where the covering layers 9, 9A have been formed is preferably in a range from 300 to 2000Ω/Sq., particularly 400 to 1000Ω/Sq.

In the present invention, it is desired that the durability of the transparent conductive layer is improved so as to keep the linearity value not greater than 1.5% after using it for a long period of time by forming the covering layer 9 or 9A on the transparent conductive layer.

The linearity value is an index for indicating uniformity of the resistivity of a transparent conductive film. The linearity value can be expressed as follows.

Electrodes made of Ag paste or the like are provided at two sides of the transparent conductive film which are opposite to each other, and a direct voltage is applied to the two electrodes. It is defined that L is a distance between the two electrodes and V is an applied voltage. Then, at arbitrary points on the transparent conductive film, distances 1 from the points to the negative electrode and potential differences v between the points and the negative electrode are measured, respectively.

The linearity value is expressed as the following formula.

$$\text{Linearity}(\%)=|1/L-v/V|\times 100$$

The smaller the linearity value, the better the uniformity of the resistivity. When the linearity value is 0%, the resistivity is perfectly uniform. In case of a resistive touch panel, a linearity value is preferably not greater than 1.5%.

Therefore, in the present invention, the material, the thickness, and the constituent of the covering layer are designed suitably in such a manner that the aforementioned values of the surface resistivity, the linearity, and the light transmittance can be obtained.

The touch panel shown in FIG. 1 includes the transparent conductive film of the present invention as an upper electrode 6A, which comprises a polymer film 4, a transparent conductive layer 5 formed on a surface of the polymer film 4, a covering layer 9 formed on the transparent conductive layer 5, and a hard-coating layer 8 formed on the other surface of the polymer film 4. Damages and delamination of the transparent conductive layer 5 of the upper electrode 6A by the input of signal are prevented, so that the touch panel has good durability and reliability in electrical properties.

The touch panel shown in FIG. 2 includes a transparent conductive film of the present invention as an upper electrode 6B, which comprises a polymer film 4, a primary layer 10 formed on a surface of the polymer film 4, a transparent conductive layer 5 formed on the primary layer 10, a covering layer 9 formed on the transparent conductive layer 5, and a hard-coating layer 8 formed on the other surface of the polymer film 4. Compared to the touch panel in FIG. 1, the touch panel in FIG. 2 is more excellent in adhesion of the transparent conductive layer 5, thus having even better durability and reliability.

The touch panel shown in FIG. 3 includes the upper electrode 6B in FIG. 2 and further includes a transparent conductive film of the present invention as a lower electrode. The lower electrode 3A of the touch panel comprises the transparent conductive film of the present invention having a polymer film 4A, a transparent conductive layer 5A formed on the polymer film 4A via a primary layer 10A, and a covering layer 9A formed on the transparent conductive layer 5A, micro-dot spacers 7 provided on the covering layer 9A, and deposited on and adhered to a plastic board 12 made of an acrylic resin, a polycarbonate resin, and so on, via a pressure-sensitive adhesive 11. In this touch panel, the transparent conductive layers 5 and 5A of the upper electrode 6B and the lower electrode 3A are protected by the covering layers 9 and 9A, respectively, and are improved in adhesion by the primary layers 10 and 10A, respectively, so that the touch panel has remarkably high durability and reliability.

The transparent conductive film of the present invention also can be used effectively for application of transparent switching devices or other various kinds of optical transparent conductive films, in addition to the application of the upper electrode or lower electrode of a touch panel.

The above explanations are common to each aspect of the present invention.

Hereinafter, the transparent conductive layer and covering layer of the transparent conductive film of each aspect of the present invention will be described.

First, the transparent conductive film of the first aspect of the present invention, which has a transparent conductive layer made of a zinc oxide system or tin oxide system on the polymer film, will be described.

In the transparent conductive film of the first aspect, the transparent conductive layers 5, 5A formed on the polymer film 4, 4A are made up of a zinc oxide system or tin oxide system (including a system doped with some material).

Examples of the material for the transparent conductive layer of the zinc oxide system are ZnO, Ga, In, B, ZnO doped with Al, etc., among them, ZnO doped with Al is preferable.

Examples of the material for the transparent conductive layer made of the tin oxide system are tin oxide ($SnO_2$), antimony tin oxide (ATO, $SnO_2$: Sb), etc.

When the transparent conductive layer 5 is very thin, enough electrical conductivity may not be obtained. When the transparent conductive layer 5 is very thick, while the electrical conductivity does not increase any more, the film-forming cost rises, and in addition, the transparent conductive film becomes thicker. Therefore, the thickness of the transparent conductive layer 5 is preferably in a range from 1 to 500 nm, particularly 5 to 200 nm.

The covering layers 9, 9A formed on the transparent conductive layers 5, 5A made of a zinc oxide system or tin oxide system are to be formed of material which does not spoil the electrical conductivity of the transparent conductive layers 5, 5A and keeps the transparency required for the transparent conductive film.

The covering layer is preferably made of material different from that of the transparent conductive film. The covering layer can consist mainly of at least one material selected from the group consisting of oxide, nitride, carbide, carbon, and their composites (for example, oxidized nitride), more concretely, of at least one selected from the group consisting of C (carbon), $CN_x$ ($x \leq 1.4$), $BN_x$ ($x \leq 1.1$), $B_xC$ ($x=1\times10^{-6}$–2), SiC, etc.

A material having low electrical conductivity or an insulating material also may be used as the covering layer when the thickness of the covering layer is very thin and will not affect the electrical conductivity of the transparent conductive layer in its vertical direction. Examples of such materials include oxide, nitride, or oxidized nitride of at least one material selected from the group consisting of Si, Ti, Sn, Nb, In, Mg, Ta and Zn, more concretely, include $SiO_x$ ($x=1.6$–2.0), $TiO_x$ ($x=1.6$–2.0), $SnO_x$ ($x=1.6$–2.0), $NbO_x$ ($x=1.0$–2.5), $InO_x$ ($x=1.0$–1.5), $MgF_x$ ($x=0.7$–1.0), $TaO_x$ ($x=1.0$–2.5), and $ZnO_x$ ($x=0.8$–1.0). Such a material may be used singly or in combination of two or more. And also such a material may be used together with one or more than two of the aforementioned conductive materials for covering layer. When the transparent conductive layer is made of a zinc oxide system, however the covering layer needs to be made of material other than $ZnO_x$ ($x=0.8$–1.0) alone. When the transparent conductive layer is made of a tin oxide system, the covering layer needs to be made of material other than $SnO_x$ ($x=1.6$–2.0) alone.

The thicknesses of the covering layers 9, 9A are determined suitably according to the material used, the light transmittance required for the transparent conductive film, the required durability, and so on. When the covering layer 9 formed on the transparent conductive layer is very thin, the covering layer 9 can not protect the transparent conductive layer well enough. On the other hand, as the covering layer 9 becomes thicker, its transparency and the electrical conductivity of the transparent conductive layer decrease, particularly, in case of using an insulating material, the decrease of the electrical conductivity becomes significant. And the transparent conductive film itself becomes thicker when the covering layer 9 becomes thicker. Therefore, the thicknesses of the covering layers 9, 9A are preferably in a range from 0.5 to 100 nm, particularly in a range from 0.5 to 50 nm.

As mentioned above, the transparent conductive film of the present invention preferably has a surface resistivity of 300 to 2000Ω/Sq., particularly of 400 to 1000Ω/Sq., at a side where the covering layer is formed and a linearity value of not greater than 1.5%. Therefore, in the present invention, the material, the thickness, and the constituent of the covering layer are designed suitably in such a manner that the aforementioned values of the surface resistivity, the linearity, and the light transmittance can be obtained.

Such a covering layer is preferably formed by a physical depositing method such as the vacuum evaporation method, the sputtering method, the ion plating method, and the laser abration method, or by a chemical depositing method such as the CVD method, more preferably by the sputtering method, because the covering layer obtained by this method is excellent in denseness and adhesion to the transparent conductive layer, has few contamination during deposition of the layer, can be formed at high rate, can be formed continuously in the same equipment after deposition of the transparent conductive layer, and is excellent in the efficiency of the formation of the layer.

When a C or $CN_x$ covering layer is formed by sputtering method, the covering layer can be deposited with the desired composition by using high-purity carbon (graphite) as a target and by adjusting kinds and flow rates of surrounding gas and reactive gas.

Particularly preferable as the covering layer is $SiC_x$ ($x=1\times10^{-6}$–10), $SiC_xO_y$ ($x=1\times10^{-6}$–10, $y=1\times10^{-6}$–5), $SiC_xN_z$ ($x=1\times10^{-6}$–10, $z=1\times10^{-6}$–5), and $SiC_xO_yN_z$($x=1\times10^{-6}$–10, $y=1\times10^{-6}$–5, $z=1\times10^{-6}$–5), which are deposited by using a SiC target and by adjusting kinds and flow rates of surrounding gas and reactive gas.

Preferable material as the SiC target is obtained by sintering SiC powder with nonmetal-based sintering assistant such as coal tar pitch, phenolic resin, furan resin, epoxy resin, glucose, cane sugar, cellulose, and starch, having a density of not smaller than 2.9 g/cm³. In case of applying high voltage during the sputtering process in order to speed up the deposition of the layer, in generally glow discharge is charged into arc discharge, which causes damages to the transparent conductive layer deposited on the polymer film. When using such an SiC target having high density and uniformity, stable discharge at high voltage can be carried out during the deposition of the layer by sputtering, so that the deposition of the layer can be hastened.

The SiC target can be manufactured by mixing SiC powder with about 3 to 30% by weight of the aforementioned nonmetal-based sintering assistant uniformly and then sintering the mixture at 1700 to 2200° C. The SiC target has a density of not smaller than 2.9 g/cm³ which is close to the theoretical density of the SiC target. Such an SiC target has no problem of generating gas during the deposition of the layer by sputtering, so that the layer can be deposited stably by sputtering.

The sputtering condition during the deposition of the covering layer is not limited, and sputtering can be conducted at a degree of vacuum from 0.05 to 1 Pa and a density of introduced electric power from 2 to 500 kW/m$^2$. Adjusting the flow rate of reactive gas and the length of time for the layer to be formed during the deposition process thereof realizes the covering layer composed of desired composition and having a desired thickness.

Though a transparent conductive layer can be formed according to conventional methods, generally, the transparent conductive layer is preferably formed by sputtering method just as the covering layer. In this case, the transparent conductive layer and the covering layer can be formed in one sputtering equipment continuously by only changing targets.

The covering layer can also be formed by coating the transparent conductive layer with the material therefor as it is or with a liquid substance including the material therefor and a solvent such as alcohol, ketone, toluene, hexane, etc.

Hereinafter, the mode of carrying out the first aspect of the present invention will be described in more detail referring to some Examples and Comparative examples.

EXAMPLE 1

A PET film having a thickness of 188 μm was employed as a substrate. A hard-coating layer with a thickness of 5 μm was, firstly, formed on one surface of the PET film by wet coating an acryl-based UV-curing hard coating material (Z7501 manufactured by JSR corporation, in which the solid content was 35% by weight and the solvent thereof was methyl ethyl ketone.).

The film was set in a magnetron RF sputtering device with both a sintered ZnO—Al target including 2% by weight of Al$_2$O$_3$ and having a purity of 99.99% and a graphite target having a purity of 99% as targets of a transparent conductive layer.

The sputtering device was evacuated with a turbo-molecular pump to lower its internal pressure to 1×10$^{-4}$ Pa, and then Ar gas was introduced into the sputtering device at flow rate of 200 sccm to hold the internal pressure at 0.3 Pa. After that, the sintered ZnO—Al target was applied with RF voltage, so that an Al-doped ZnO thin layer having a thickness of about 80 nm was deposited on a surface of the PET film opposite to the surface where the hard-coating layer was formed to make the surface resistivity thereof to be about 500Ω/Sq. Then the gas in the chamber was replaced by Ar gas, and the internal pressure thereof was adjusted to 0.5 Pa. After that, the graphite target was applied with DC pulse voltage, so that a carbon thin layer having a thickness of about 3 nm was deposited onto the Al-doped ZnO thin layer as a covering layer.

Introduced DC power of the sputtering device was set at 2 kW.

The resulted transparent conductive film was measured in its surface resistivity at a side where the covering layer was deposited by using a surface resistivity measuring device (Loresta AP manufactured by Mitsubishi Chemical corporation), and was tested in resistance to sliding wear in the sliding wear test conducted by scratching the surface with a pen in the following manner. The results are shown in Table 1.

<Sliding Wear Test Conducted by Scratching the Surface of the Film with a Pen>

The side of the transparent conductive film covered with a transparent conductive layer (a covering layer) faced a surface of an ITO glass board where micro-dot spacers were provided, and these were laminated to each other. And then, the other surface of the transparent conductive film covered with a hard-coating layer was scratched back and forth with a pen made of polyacetal resin (its tip part has a curvature radius of 0.8 R) under a load of 250 gf. After that, the film was determined in a linearity value. If the linearity was not larger than 1.5%, the film was regarded to be "Good", however, if the linearity was larger than 1.5%, the film, was regarded to be "Inferior". The appearance of the films were also observed.

EXAMPLE 2

A transparent conductive film was produced in the same manner as in Example 1 except that an SiC target was used instead of the graphite target and an SiC thin layer having a thickness of about 3 nm was deposited as a covering layer.

The resulted transparent conductive film was measured in the surface resistivity and the resistance to sliding wear in the same manner as in Example 1. The results are shown in Table 1.

The SiC target used in Example 2 was obtained by mixing SiC powder with 20% by weight of phenolic resin as a sintering assistant uniformly and sintering at 2100° C. The SiC target had a density of 2.92 g/cm$^3$.

EXAMPLE 3

A transparent conductive film was prepared in the same manner as in Example 2 except that after the Al-doped ZnO transparent conductive layer was deposited, mixed gas of 170 sccm Ar gas and 30 sccm O2 gas was introduced into the chamber to hold the internal pressure at 0.5 Pa, and then the SiC target was applied with DC pulse voltage, so that an SiC$_x$O$_y$ (x=0.05, y=1.9) thin layer having a thickness of about 3 nm was deposited as a covering layer.

The resulted transparent conductive film was measured in the surface resistivity and the resistance to sliding wear in the same manner as in Example 1. The results are shown in Table 1.

COMPARATIVE EXAMPLE 1

A transparent conductive film was prepared in the same manner as Example 1 except that a covering layer was not formed.

The resulted transparent conductive film was measured in the surface resistivity and the resistance to sliding wear in the same manner as Example 1. The results are shown in Table 1.

EXAMPLE 4

A transparent conductive film was prepared in the same manner as Example 1 except that:

a sintered tin oxide (SnO$_2$) target having a purity of 99.99% and a graphite target having a purity of 99% were employed as the targets of a transparent conductive layer; 180 sccm Ar gas and 20 sccm O$_2$ gas were introduced into the sputtering device in the form of a mixed gas so as to hold the internal pressure thereof at 0.3 Pa, after the sputtering device was evacuated with the turbo-molecular pump to lower its internal pressure down to 1×10$^{-4}$ Pa; and the SnO$_2$ target was, then, applied with RF voltage, so that an SnO$_2$ thin layer having a thickness of about 160 nm was deposited on a surface of the PET film opposite to the surface where the hard-coating layer was formed to make the surface resistivity about 500Ω/Sq.

The resulted transparent conductive film was measured in the surface resistivity and the resistance to sliding wear in the same manner as Example 1. The results are shown in Table 1.

EXAMPLE 5

A transparent conductive film was produced in the same manner as Example 4 except that the same SiC target as that of Example 2 was used instead of the graphite target and an SiC thin layer having a thickness of about 3 nm was deposited as a covering layer.

The resulted transparent conductive film was measured in the surface resistivity and the resistance to sliding wear in the same manner as Example 1. The results are shown in Table 1.

EXAMPLE 6

A transparent conductive film was prepared in the same manner as in Example 5 except that after the $SnO_2$ transparent conductive layer was deposited, mixed gas of 170 sccm Ar gas and 30 sccm O2 gas was introduced into the chamber to hold the internal pressure at 0.5 Pa, and then the SiC target was applied with DC pulse voltage, so that an $SiC_xO_y$, (x=0.05, y=1.9) thin layer having a thickness of about 3 nm was deposited as a covering layer.

The resulted transparent conductive film was measured in the surface resistivity and the resistance to sliding wear in the same manner as in Example 1. The results are shown in Table 1.

COMPARATIVE EXAMPLE 2

A transparent conductive film was prepared in the same manner as Example 4 except that a covering layer was not formed.

The resulted transparent conductive film was measured in the surface resistivity and the resistance to sliding wear in the same manner as in Example 1. The results are shown in Table 1.

TABLE 1

| | Type of transparent conductive layer | Material of covering layer | Surface resistivity (Ω/Sq.) | Result of abration test |
|---|---|---|---|---|
| Example 1 | Al-doped ZnO | C | about 500 | Linearity value was not larger than 1.5% after scratching the film back and forth with a pen for one hundred thousand times. Appearance of the film was not changed. |
| Example 2 | | SiC | about 500 | Linearity value was not larger than 1.5% after scratching the film back and forth with a pen for one hundred thousand times. Appearance of the film was not changed. |
| Example 3 | | $SiC_xO_y$ | about 500 | Linearity value was not larger than 1.5% after scratching the film back and forth with a pen for one hundred thousand times. Appearance of the film was not changed. |
| Comparative Example 1 | | — | about 500 | Linearity value exceeded 1.5% after scratching the film back and forth with a pen for fourty thousand times. The scratched part of the film became clouded. |
| Example 4 | $SnO_2$ | C | about 500 | Linearity value was not larger than 1.5% after scratching the film back and forth with a pen for one hundred thousand times. Appearance of the film was not changed. |
| Example 5 | | SiC | about 500 | Linearity value was not larger than 1.5% after scratching the film back and forth with a pen for one hundred thousand times. Appearance of the film was not changed. |
| Example 6 | | $SiC_xO_y$ | about 500 | Linearity value was not larger than 1.5% after scratching the film back and forth with a pen for one hundred thousand times. Appearance of the film was not changed. |
| Comparative Example 2 | | — | about 500 | Linearity value exceeded 1.5% after scratching the film back and forth with a pen for fourty thousand times. The scratched part of the film became clouded. |

As cleared from Table 1, according to the first aspect of the present invention, a transparent conductive film having no problem of degradation of the electrical properties and having good durability is provided.

As described in detail, according to the first aspect of the present invention, a transparent conductive film in which damages and delamination of a transparent conductive layer are prevented effectively by a covering layer formed on the transparent conductive layer, and a touch panel including the transparent conductive film, which has no problem of degradation of electrical properties caused by damages and delamination of the transparent conductive layer, thus having good durability and reliability, are provided.

Following will describe a transparent conductive film of the second aspect of the present invention.

In the transparent conductive film of the second aspect, material including a main component composed of at least one selected from a group consisting of indium oxide, tin oxide and zinc oxide, such as an oxide system including ITO (indium tin oxide), ATO (antimony tin oxide), ZnO, ZnO doped with Al, $SnO_2$, etc., is preferably employed for the transparent conductive layers 5, 5A formed on the polymer film 4, 4A. Particularly, an indium oxide-system (including a system doped with indium oxide), and compound of indium oxide and tin oxide (ITO), and compound of indium oxide and zinc oxide (IZO) are preferable. The thickness of the transparent conductive layer 5 is set to match the desired surface resistance, and is preferable to be 1 to 500 nm, particularly 5 to 100 nm.

The dielectric layers of the covering layers 9, 9A formed on the transparent conductive layers 5, 5A, are formed of material which does not spoil the electrical conductivity of the transparent conductive layers 5, 5A and maintains the transparency required for the transparent conductive film.

The preferable example of the material for the dielectric layer includes a main component composed of at least one compound selected from the group consisting of oxide, nitride, carbide, organic polymer, and their composites (for example, oxidized nitride), more concretely, at least one selected from the group consisting of $CN_x$ ($x \leq 1.4$), $BN_x$ ($x \leq 1.1$), $B_xC$ ($x \leq 1 \times 10^{-6}$–2), $SiO_x$ ($x=0.01$–2.0), $SiC_x$ ($x=1\times10^{-6}$–10), $SiC_xO_y$ ($x=1\times10^{-6}$–10, $y=1\times10^{-6}$–5), $SiC_xN_z$ ($x=1\times10^{-6}$–10, $z=1\times10^{-6}$–5), $SiC_xO_yN_z$ ($x=1\times10^{-6}$–10, $y=1\times10^{-6}$–5, $z=1\times10^{-6}$ 5), $TiN_x$ ($x=0.01$–3.0), $TiO_x$ ($x=1.6$–2.0), ZnO, $Al_2O_3$, $MgF_2$, $ZrO_2$, etc.

The electrostatic capacity per unit area C of the dielectric layer should be small in the sake of cancellation of aforementioned non-uniformity of the electrical field distribution. The dielectric layer is required to have some measure of thickness in view of an effect of physical protection given by the dielectric layer. Therefore, the dielectric layer is desired to have some measure of thickness and relatively small dielectric constant. High dielectric constant is apt to cause polarization, so that the dielectric layer can not give the above effect of cancellation sufficiently.

When the transparent conductive film is employed as an electrode of a touch panel, it is necessary to minimize voltage drop in the direction across the dielectric layer, and thus the dielectric layer is desired to have a large electrostatic capacity par unit area C. And in this case, since a large thickness of the dielectric layer makes the response of the touch panel poor, the dielectric layer is desired to be thin in thickness.

In order to provide good effects in the cancellation of non-uniformity of the electrical field distribution, protection by the dielectric layer, minimization of voltage drop, and sensitization of a touch panel, the material and the thickness of the dielectric layer are preferable to be designed suitably in such a manner that the ratio of relative dielectric constant $\in_r$ to the thickness d(m) of the dielectric layer ($\in_r/d(m^{-1})$) becomes $10^6 < \in_r/d < 10^{12}$, particularly $10^6 < \in_r/d < 10^{11}$.

In non-magnetic material, there is the relation $n^2 = \in_r$ between refractive index n and the relative dielectric constant $\in_r$, therefore, the above relation between the relative dielectric constant and the thickness can be replaced by the relation between the refractive index and the thickness.

As aforementioned above, the transparent conductive film of the present invention preferably has a surface resistivity of 300 to 2000Ω/Sq., particularly of 400 to 1000 ΩSq., at a side where the dielectric layer is formed and a linearity value of not greater than 1.5%.

Therefore, in the present invention, the material, the thickness, and the constituent of the dielectric layer are designed suitably in such a manner that the aforementioned values of the surface resistivity, the linearity, and the light transmittance, as well as the ratio of the relative dielectric constant $\in_r$ and the thickness d(m) ($\in_r/d(m^{-1})$), can be obtained.

Such a dielectric layer is preferably formed by a physical gas phase growth method such as the vacuum evaporation method, the sputtering method, the ion plating method, and the laser abration method, or by a chemical gas phase growth method such as the CVD method, more preferably by the sputtering method, because the dielectric layer obtained by this method is excellent in denseness and adhesion to the transparent conductive layer, has few contamination during deposition of the layer, can be formed at high rate, can be formed continuously in the same equipment after deposition of the transparent conductive layer, and is excellent in the efficiency of the formation of the layer.

When a $CN_x$, $SiO_x$ or $TiO_x$ dielectric layer is formed by sputtering method, each dielectric layer can be deposited with the desired composition by using high-purity carbon (graphite), Si or Ti as a target, respectively, and by adjusting kinds and flow rates of surrounding gas and reactive gas.

Particularly preferable as the dielectric layer is $SiC_x$ ($x=1\times10^{-6}$–10), $SiC_xO_y$ ($x=1\times10^{-6}$–10, $y=1\times10^{-6}$–5), $SiC_xN_z$ ($x=1\times10^{-6}$–10, $z=1\times10^{-6}$–5), and $SiC_xO_yN_z$ ($x=1\times10^{-6}$–10, $y=1\times10^{-6}$–5, $z=1\times10^{-6}$–5), which are deposited by using a an SiC target and by adjusting kinds and flow rates of surrounding gas and reactive gas.

Preferable material as the SiC target is obtained by sintering SiC powder with nonmetal-based sintering assistant such as coal tar pitch, phenolic resin, furan resin, epoxy resin, glucose, cane sugar, cellulose, and starch, having a density of not smaller than 2.9 g/cm³. In case of applying high voltage during the sputtering process in order to speed up the deposition of the layer, glow discharge is charged into arc discharge, which causes damages to the transparent conductive layer deposited on the polymer film. But when using such an SiC target having high density and uniformity, stable discharge at high voltage can be carried out during the deposition of the layer by sputtering, so that the deposition of the layer can be hastened.

The SiC target can be manufactured by mixing SiC powder with 3 to 30% by weight of the aforementioned nonmetal-based sintering assistant uniformly and then sintering the mixture at 1700 to 2200° C. Such an SiC target has a density of not smaller than 2.9 g/cm³ which is close to the theoretical generally density of the SiC target. Such an SiC target has no problem of generating gas during the deposition of the layer by sputtering, so that the layer can be deposited stably by sputtering.

The sputtering condition during the deposition of the dielectric layer is not limited, and sputtering can be conducted at a degree of vacuum from 0.05 to 1 Pa and a density of introduced electric power from 2 to 500 kW/m². Adjusting the flow rate of reactive gas and the length of time for the layer to be formed during the deposition process thereof realizes the dielectric layer composed of desired composition and having a desired thickness.

Though a transparent conductive layer can be formed according to conventional methods, generally, the transparent conductive layer is preferably formed by sputtering method just as the dielectric layer. In this case, the transparent conductive layer and the dielectric layer can be formed in one sputtering equipment continuously by only changing targets.

The covering layer can also be formed by coating the transparent conductive layer with the material therefor as it is or with a liquid substance including the material therefor and a solvent such as alcohol, ketone, toluene, hexane, etc.

Hereinafter, the mode of carrying out the second aspect of present invention will be described in more detail referring to some Examples and Comparative examples. It should be noted that the present invention is not limitative to them.

EXAMPLE 7–9, COMPARATIVE EXAMPLE 3

In each of Examples and Comparative Example, a PET film having a thickness of 188 µm was employed as a substrate. A hard-coating layer with a thickness of 5 µm was, firstly, formed on one surface of the PET film by wet coating an acryl-based UV-curing hard coating material (Z7501 manufactured by JSR corporation, in which the solid content was 35% by weight and the solvent thereof was MEK.).

Each film was set in a magnetron DC sputtering device with a sintered ITO target including 10% by weight of tin oxide and having a purity of 99.99% and an Si target having a purity of 99.99% as targets of a transparent conductive layer.

The sputtering device was evacuated with a turbo-molecular pump to lower its internal pressure to $1 \times 10^{-4}$ Pa, and then Ar gas and $O_2$ gas were introduced into the sputtering device at flow rate of 46 sccm and 4 sccm, respectively, as a mixed gas to hold the internal pressure at 0.5 Pa. After that, the sintered ITO target was applied with voltage, so that an ITO thin layer having a thickness of about 20 nm was deposited on a surface of the PET film opposite to the surface where the hard-coating layer was formed to make a surface resistance 500Ω/Sq. Secondly, device was evacuated again sufficiently, and then 25 sccm Ar gas and 25 sccm $O_2$ gas were introduced in the form of a mixed gas so as to hold the internal pressure at 0.5 Pa. After that, the Si target was applied with voltage, so that an $SiO_x$ (x=1.2) thin layer having a thickness shown in Table 2 was deposited onto the ITO thin layer as a dielectric layer. The ratio of the relative dielectric constant $\in_r$ to the thickness d(m) ($\in_r/d(m^{-1})$) of the $SiO_x$ thin layer of each film became as shown in Table 2.

Introduced DC power of the sputtering device was set at 50 kW/m².

Each of the resulted transparent conductive films was measured in its surface resistivity at a side where the dielectric layer was deposited by using a surface resistivity measuring device (Roresta AP manufactured by Mitsubishi Chemical corporation), and was tested in resistance to sliding wear in the sliding wear test conducted by the same manner as Example 1. The results are shown in Table 2.

EXAMPLES 10–12, COMPARATIVE EXAMPLE 4

In each of Examples and Comparative Example, a transparent conductive film was produced in the same manner as in Example 7 except that a Ti target was used instead of the Si target, and a $TiO_x$ (x=1.7) thin layer having a thickness and $\in_r/d$ ratio shown in Table 2 was deposited as a dielectric layer.

Each of the resulted transparent conductive film was measured in the surface resistivity and the resistance to sliding wear in the same manner as Example 7. The results are shown in Table 2.

COMPARATIVE EXAMPLE 5

A transparent conductive film was prepared in the same manner as Example 7 except that a dielectric layer was not formed.

The resulted transparent conductive film was measured in the surface resistivity and the resistance to sliding wear in the same manner as Example 7. The results are shown in Table 2.

TABLE 2

| | | Material of dielectric layer | thickness of dielectric layer (nm) | $\in_r/d$ (m$^{-1}$) | Surface resistivity (Ω/Sq.) | Result of abration test |
|---|---|---|---|---|---|---|
| Examples | 7 | $SiO_x$ | 1000 | $2 \times 10^6$ | about 500 | Linearity value was not larger than 1.5% after scratching the film back and forth with a pen for one hundred thousand times. Appearance of the film was not changed. |
| | 8 | | 4 | $5 \times 10^8$ | about 500 | |
| | 9 | | 0.02 | $9 \times 10^{10}$ | about 500 | |
| | 10 | $TiO_x$ | 3000 | $2 \times 10^6$ | about 500 | |
| | 11 | | 13 | $5 \times 10^8$ | about 500 | |
| | 12 | | 0.07 | $9 \times 10^{10}$ | about 500 | |
| Comparative Examples | 3 | $SiO_x$ | 2000 | $9 \times 10^5$ | about 500 | Linearity value exceeded 1.5% after scratching the film back and forth with a pen for fourty thousand times. The scratched part of the film became clouded. |
| | 4 | $TiO_x$ | 7000 | $9 \times 10^5$ | about 500 | |

TABLE 2-continued

| Material of dielectric layer | thickness of dielectric layer (nm) | $\epsilon_r/d$ (m$^{-1}$) | Surface resistivity (Ω/Sq.) | Result of abration test |
|---|---|---|---|---|
| 5 | — | — | — | about 500 | Linearity value exceeded 1.5% after scratching the film back and forth with a pen for twenty thousand times. The scratched part of the film became clouded. |

As cleared from Table 2, according to the second aspect of the present invention, a transparent conductive film having no problem of degradation of the electrical properties and having good durability is provided.

As described in detail, according to the second aspect of the present invention, a transparent conductive film in which non-uniformity of the electrical field distribution is cancelled, as well as damages and delamination of a transparent conductive layer are prevented effectively by a dielectric layer formed on the transparent conductive layer, and a touch panel including the transparent conductive film, which has no problem of degradation of electrical properties caused by damages and delamination of the transparent conductive layer, and has a uniform electrical field distribution, thus having good durability and reliability, is provided.

Hereinafter, a transparent conductive film having a metal layer or a layer produced by oxidizing, nitriding or oxynitriding a metal layer as a dielectric layer, and a method for the manufacture thereof according to the third aspect will be described.

In the transparent conductive film of the third aspect, material including a main component composed of at least one selected from a group consisting of indium oxide, tin oxide and zinc oxide, such as an oxide system including ITO (indium tin oxide), ATO (antimony tin oxide), ZnO, ZnO doped with Al, SnO$_2$, etc., is preferably employed for the transparent conductive layers 5, 5A formed on the polymer films 4, 4A Particularly, an indium oxide-system (including a system doped with indium oxide), and compound of indium oxide and tin oxide (ITO), and compound of indium oxide and zinc oxide (IZO) are preferable. The thickness of the transparent conductive layer 5 is set to match the desired surface resistance, and is preferable to be 1 to 500 nm, particularly 5 to 100 nm.

In the third aspect, the covering layers 9, 9A formed on the transparent conductive layers 5, 5A are a metal layer or a layer produced by oxidizing, nitriding or oxynitriding a metal layer.

At least one metal selected from a group consisting of Ti, Si, Nb, In, Zn, Sn, Au, Ag, Cu, Al, Co, Cr, Ni, Pb, Pd, Pt, W, Zr, Ta and Hf, or material including the metal as a main component, particularly material including at least one from among Ti, Sn, Si, Nb, Al, Ni and Ta as a main component, is preferably employed as the material for the metal layer constituting the covering layer. The metal layer may be doped with B, C, H, N, F, Ga, etc. to the metal main component.

The covering layers 9, 9A made up of the metal layer can improve the abrasion durability without deterioration of the electrical conductivity of the transparent conductive layer. Although a metal layer usually has low light transmittance, the covering layer of metal of the present invention is formed in a very small thickness for which the covering layer does not lower the light transmittance of the transparent conductive film, so that the problem of lowering the light transmittance of the transparent conductive film by the covering layer of metal formed thereon will not occur in the present invention, while the covering layer of metal can give the sufficient abrasion durability to the covering layer even when the covering layer has only such a small thickness.

The covering layers 9, 9A of the present invention are improved in light transmittance by oxidizing, nitriding or oxynitriding the metal layer formed on the transparent conductive layer, so that the transparent conductive layer will not be reduced an light transmittance by the covering layers 9, 9A formed thereon. In this case, examples of the oxidizing, nitriding or oxynitriding treatment are subjected to heat treatment of the metal layer in an atmosphere of oxygen, and surface treatment of the metal layer with oxygen plasma and/or nitrogen plasma.

The requirements for the oxidizing, nitriding or oxynitriding treatment are alterable to the type and thickness of the metal layer and the desired degree of purification of shade of the metal layer, the heat treatment is usually conducted at 150 to 180° C., for 2 to 8 hours, and the surface treatment with oxygen plasma and/or nitrogen plasma is usually conducted at about 100 to 1000 W, for 1 to 30 minutes.

The thicknesses of the covering layers 9, 9A are determined suitably according to the used material, the light transmittance required for the transparent conductive film, the required durability, and so on. When the covering layer 9 formed on the transparent conductive layer is very thin, the covering layer 9 can not protect the transparent conductive layer well enough. On the other hand, as the covering layer 9 becomes thicker, its transparency decreases. Particularly, in case of the covering layer produced by oxidizing, nitriding or oxynitriding the metal layer, decrease of the electrical conductivity of the transparent conductive layer becomes significant as the covering layer becomes thicker. And the transparent conductive film itself becomes thicker when the covering layer 9 becomes thicker. Therefore, the thicknesses of the covering layers 9, 9A are preferably in a range from 0.5 to 100 nm, particularly in a range from 0.5 to 50 nm.

As mentioned above, the transparent conductive film of the present invention preferably has a surface resistivity of 300 to 2000ΩSq., particularly of 400 to 1000ΩSq., at a side where the covering layer is formed and a linearity value of not greater than 1.5%. Therefore, in the present invention, the material, the thickness, and the constituent of the covering layer are designed suitably in such a manner that the aforementioned values of the surface resistivity, the linearity, and the light transmittance can be obtained.

Such a metal layer of the covering layer is preferably formed by a physical depositing method such as the vacuum evaporation method, the sputtering method, the ion plating method, and the laser abration method, or by a chemical depositing method such as the CVD method, more preferably by the sputtering method, because the covering layer obtained by this method is excellent in denseness and adhesion to the transparent conductive layer, has few contamination during deposition of the layer, can be formed at high rate, can be formed continuously in the same equipment after deposition of the transparent conductive layer, and is excellent in the efficiency of the formation of the layer. The metal layer is easily purified of shade by oxidizing, nitriding or oxynitriding it after formation thereof by the above method.

The sputtering condition during the deposition of the covering layer is not limited, and sputtering can be conducted at a degree of vacuum from 0.05 to 1 Pa and a density of introduced electric power from 2 to 500 $kW/m^2$. Adjusting the flow rate of reactive gas and the length of time for the layer to be formed during the deposition process thereof realizes the covering layer composed of desired composition and having a desired thickness.

Though a transparent conductive layer can be formed according to conventional methods, generally, the transparent conductive layer is preferably formed by sputtering method just as the covering layer. In this case, the transparent conductive layer and the covering layer can be formed in one sputtering equipment continuously by only changing targets.

Hereinafter, the mode of carrying out the third aspect of the present invention will be described in more detail referring to some Examples and Comparative examples. It should be noted that the present invention is not limitative to them.

EXAMPLE 13

A PET film having a thickness of 188 μm was employed as a substrate. A hard-coating layer with a thickness of 5 μm was, firstly, formed on one surface of the PET film by wet coating an acryl-based UV-curing hard coating material (Z7501 manufactured by JSR corporation, in which the solid content was 35% by weight and the solvent thereof was methyl ethyl ketone.).

The film was set in the vacuum chamber of a magnetron DC sputtering device with both an ITO target including 10% by weight of tin oxide and having a purity of 99.99% and a Ti target having a purity of 99.99% as targets of a transparent conductive layer.

The chamber was evacuated with a turbo-molecular pump to lower its internal pressure to $5 \times 10^{-4}$ Pa, and then Ar gas and $O_2$ gas were introduced into the sputtering device at flow rate of 196 sccm and 4 sccm, respectively, as a mixed gas to hold the internal pressure at 0.5 Pa. After that, the ITO target was applied with voltage at 4 kW, so that an ITO thin layer having a thickness of about 20 nm was deposited on a surface of the PET film opposite to the other surface where the hard-coating layer was formed, as the surface resistance became about 500Ω/Sq. Then the gas in the chamber was replaced by Ar gas, and the internal pressure was adjusted to 0.5 Pa. After that, the Ti target was applied with voltage at 2 kW, so that a Ti thin layer having a thickness of about 3 nm was deposited onto the ITO thin layer as a covering layer.

The resulted transparent conductive film was measured in its surface resistivity at a side where the covering layer was deposited by using a surface resistivity measuring device (Loresta AP manufactured by Mitsubishi Chemical corporation), and was tested in resistance to sliding wear in the same way as Example 1. The results are shown in Table 3.

The lamination film composed of the hard coat layer, the PET film, the ITO layer and the Sn layer was measured in the total luminous transmittance. The result is shown in Table 3.

EXAMPLE 14

A transparent conductive film was produced in the same manner as Example 13 except that an Sn target having a purity of 99.99% was used instead of the Ti target and an Sn thin layer having a thickness of about 3 nm was deposited as a covering layer.

The resulted transparent conductive film was measured in the surface resistivity, the total luminous transmittance and the resistance to sliding wear in the same manner as Example 13. The results are shown in Table 3.

EXAMPLE 15

A transparent conductive film was produced in the same manner as Example 13 except that: the transparent conductive layer on a surface of which the Ti thin layer had been formed was set in the vacuum chamber; the chamber was evacuated to $5 \times 10^{-4}$ Pa, and then $O_2$ gas was introduced into the chamber to hold the internal pressure thereof at 50 Pa; and after that, the Ti thin layer was applied with surface treatment with oxygen plasma of 300 W RF power for about 1 minute, so as to purify the Ti thin layer of shade.

The resulted transparent conductive film was measured in the surface resistivity, the total luminous transmittance and the resistance to sliding wear in the same manner as Example 13. The results are shown in Table 3.

EXAMPLE 16

A transparent conductive film was produced in the same manner as Example 14 except that: the transparent conductive layer on the surface of which the Sn thin layer had been formed was set in a hot-air oven; and then, the Sn thin layer was applied with heat treatment at 150° C. in an atmosphere of oxygen for 3 hours, so as to purify the Sn thin layer of shade.

The resulted transparent conductive film was measured in the surface resistivity, total luminous transmittance and the resistance to sliding wear in the same manner as Example 13. The results are shown in Table 3.

COMPARATIVE EXAMPLE 6

A transparent conductive film was prepared in the same manner as Example 13 except that a covering layer was not formed.

The resulted transparent conductive film was measured in the surface resistivity, the total luminous transmittance and the resistance to sliding wear in the same manner as Example 13. The results are shown in Table 3.

TABLE 3

| | Material of covering layer | Surface resistivity (Ω/Sq.) | Result of abration test | Total luminous transmittance (%) |
|---|---|---|---|---|
| Example 13 | Ti | about 500 | Linearity value was not larger than 1.5% after scratching the film back and forth with a pen for one hundred thousand times. Appearance of the film was not changed. | 86.5 |
| Example 14 | Sn | about 500 | Linearity value was not larger than 1.5% after scratching the film back and forth with a pen for one hundred thousand times. Appearance of the film was not changed. | 83.7 |
| Example 15 | oxidezed Ti | about 500 | Linearity value was not larger than 1.5% after scratching the film back and forth with a pen for one hundred thousand times. Appearance of the film was not changed. | 89.5 |
| Example 16 | oxidized Sn | about 500 | Linearity value was not larger than 1.5% after scratching the film back and forth with a pen for one hundred thousand times. Appearance of the film was not changed. | 90.2 |
| Comparative Example 6 | — | about 500 | Linearity value exceeded 1.5% after scratching the film back and forth with a pen for twenty thousand times. The scratched part of the film became clouded. | 88.5 |

As cleared from Table 3, according to the third aspect of the present invention, a transparent conductive film having no problem of degradation of the electrical properties and having good durability is provided. Table 3 also shows that the covering layer composed of the metal layer does not deteriorate the transparency of the transparent conductive film, and the covering layer produced by oxidizing, nitriding or oxynitriding the metal layer can improve the light transmittance of the film.

As described in detail, according to the third aspect of the present invention, a transparent conductive film in which damages and delamination of a transparent conductive layer are prevented effectively by a covering layer formed on the transparent conductive layer, and a touch panel including the transparent conductive film, which has no problem of degradation of electrical properties caused by damages and delamination of the transparent conductive layer, thus having good durability and reliability, are provided.

What is claimed is:

1. A transparent conductive film comprising:
   a polymer film,
   a transparent conductive layer formed on the polymer film, and consisting of one of a zinc oxide system and a tin oxide system, and
   a covering layer formed on the transparent conductive layer and consisting mainly of at least one material selected from the group consisting of C, $CN_x$, $BN_x$, $B_xC$ and $SiC_x$.

2. A transparent conductive film as claimed in claim 1, wherein the covering layer has a thickness of 0.5 to 100 nm.

3. A transparent conductive film as claimed in claim 1, wherein the covering layer is formed by a physical vapor-depositing process selected from vacuum evaporation process, sputtering process, ion plating process, and laser abrasion process, or by a chemical vapor deposition process.

4. A transparent conductive film as claimed in claim 1, wherein the covering layer is formed by coating a raw liquid for the transparent conductive layer or a solution of the material of the covering layer dissolved in a solvent.

5. A transparent conductive film as claimed in claim 1, wherein a surface of the transparent conductive film where the covering layer is formed has a surface resistivity of 300 to 2000Ω/Sq. and a linearity value not larger than 1.5%.

6. A transparent conductive film as claimed in claim 1, wherein the transparent conductive layer consists of zinc oxide applied with doping.

7. A transparent conductive film as claimed in claim 6, wherein the transparent conductive layer consists of zinc oxide doped with aluminum.

8. A transparent conductive film as claimed in claim 1, wherein the transparent conductive layer is made of tin oxide or antimony tin oxide.

9. A touch panel provided with a transparent conductive film as claimed in claim 1.

10. A transparent conductive film comprising:
    a polymer film,
    a transparent conductive layer formed on the polymer film and consisting of one of a zinc oxide system and a tin oxide system, and
    a covering layer formed on the transparent conductive layer and consisting of nitride, or oxidized nitride of at least one material selected from the group consisting of Si, Ti, Sn, Nb, In, Mg, Ta and Zn.

11. A touch panel provided with a transparent conductive film as claimed in claim 10.

12. A transparent conductive film comprising:
    a polymer film,
    a transparent conductive layer formed on the polymer film and consisting of one of a zinc oxide system and a tin oxide system, and
    a covering layer formed on the transparent conductive layer, said covering layer being a thin film consisting of $SiC_x$, $SiC_xO_y$, $SiC_xN_z$, or $SiC_xO_yN_z$ deposited by sputtering with an SiC target.

13. A transparent conductive film as claimed in claim 12, wherein the SiC target has a density of not smaller than 2.9 g/cm$^3$.

14. A transparent conductive film as claimed in claim 12, wherein the SiC target is prepared by sintering a mixture of SiC powder and a nonmetal-based sintering assistant.

15. A transparent conductive film comprising:
   a polymer film,
   a transparent conductive layer formed on the polymer film, and
   a covering layer covering the transparent conductive layer, said covering layer being a metal nitriding or oxynitriding layer formed on the transparent conductive layer at a side opposite to the polymer film, said metal nitriding or oxynitriding layer consisting of at least one metal layer selected from the group consisting of Nb, In, Zn, Sn, Co, Pb, W, Zr, and Hf, or including at least one metal selected from the above as a main component.

16. A transparent conductive film as claimed in claim 15, wherein the covering layer is produced by applying heat treatment to the metal layer formed on the transparent conductive layer in an atmosphere of oxygen.

17. A transparent conductive film as claimed in claim 15, wherein the covering layer is produced by applying surface treatment with oxygen plasma and/or nitrogen plasma to the metal layer formed on the transparent conductive layer.

18. A transparent conductive film as claimed in claim 15, wherein the covering layer is formed by a physical vapor-depositing process selected from vacuum evaporation process, sputtering process, ion plating process, and laser abrasion process, or by a chemical vapor-depositing process including CVD.

19. A transparent conductive film as claimed in claim 15, wherein the covering layer has a thickness of 0.5 to 100 nm.

20. A transparent conductive film as claimed in claim 15, wherein a surface of the transparent conductive film where the covering layer is formed thereon has a surface resistivity of 300 to 2000$\Omega$/Sq. and a linearity value of not larger than 1.5%.

21. A transparent conductive film as claimed in claim 15, wherein the transparent conductive layer has a main component including at least one selected from the group consisting of indium oxide, tin oxide, and zinc oxide.

22. A touch panel provided with a transparent conductive film as claimed in claim 15.

* * * * *